United States Patent [19]

Hoekstra

[11] 3,998,759
[45] Dec. 21, 1976

[54] METHOD OF CATALYST MANUFACTURE
[75] Inventor: James Hoekstra, Evergreen Park, Ill.
[73] Assignee: Universal Oil Products Company, Des Plaines, Ill.
[22] Filed: Jan. 29, 1975
[21] Appl. No.: 545,064
[52] U.S. Cl. .................. 252/466 PT; 252/455 R; 252/463
[51] Int. Cl.$^2$ .................. B01J 29/06; B01J 23/62; B01J 23/08
[58] Field of Search .......... 252/466 PT, 455 R, 463
[56] References Cited
UNITED STATES PATENTS

| | | | |
|---|---|---|---|
| 3,367,888 | 2/1968 | Hoekstra | 252/460 X |
| 3,518,207 | 6/1970 | Hagy et al. | 252/466 PT |
| 3,842,017 | 10/1974 | Armistead et al. | 252/466 PT |

*Primary Examiner*—Carl F. Dees
*Attorney, Agent, or Firm*—James R. Hoatson, Jr.; William H. Page, II; Robert W. Welch

[57] ABSTRACT

A method of impregnating a catalytic component on the outer surface of a carrier material is presented. The carrier material is commingled with a common solution of a precursor compound of a catalytically active metallic component and a sulfur-containing carboxylic acid whereby said component is deposited on the outer surface of the carrier material. The aforesaid solution is first aged to yield a catalyst of improved exhaust gas conversion activity.

13 Claims, No Drawings

METHOD OF CATALYST MANUFACTURE

Gaseous waste products resulting from the burning or combustion of hydrocarbonaceous fuels such as gasoline and fuel oils comprise hydrocarbons, carbon monoxide and oxides of nitrogen as products of combustion or incomplete combustion. While exhaust gases from other hydrocarbonaceous fuel burning sources such as stationary engines, industrial furnaces, and the like, are a substantial factor, the exhaust gases of automotive engines are a principal source of pollution. In recent years, with the ever-growing number of automobiles, trucks and buses powered by internal combustion engines, the discharge of exhaust gases to the atmosphere has been of increasing concern. In urban areas, where said exhaust gases pose a particularly serious health problem, the control of said gases is exceedingly important. Of the various methods which have been proposed, the incorporation of a catalytic converter in the exhaust system holds the most promise of meeting the increasingly rigid standards set by the responsible governmental agencies.

This invention relates to a method of manufacturing a catalyst particularly useful in a catalytic converter for the conversion of the oxidizable components, particularly unburned hydrocarbons and carbon monoxide, contained in exhaust gases from an internal combustion engine. It has heretofore been shown that a catalytically active metallic component deposited on the outer surface of a support or carrier material provides a particularly useful catalyst for the conversion of the oxidizable components contained in the hot exhaust gases emanating from an internal combustion engine. For example, see U.S. Pat. No. 3,367,888 which provides a method of impregnating a catalytic component on the outer surface of a carrier material without any substantial penetration thereof. Briefly, the method comprises commingling a sulfur-containing carboxylic acid and a precursor compound of a catalytically active metallic component in common solution whereby a carrier material subsequently impregnated with said solution has the catalytically active metallic component deposited on the outer surface thereof.

It is an object of this invention to present an improvement in the described method of manufacture resulting in higher conversions of the oxidizable components, especially hydrocarbons and carbon monoxide, contained in exhaust gases from an internal combustion engine.

In one of its broad aspects, the present invention embodies a method of catalyst manufacture which comprises commingling a refractory inorganic oxide carrier material with a common solution of a precursor compound of a catalytically active metallic component and a sulfur-containing carboxylic acid and effecting deposition of said metallic component on the outer surface of said carrier material, said solution being first aged for a period of from about 5 minutes to about 24 hours, the required aging time decreasing in said range as the temperature of the aging process is increased in the range of from about 25° to about 100° C.

One of the more specific embodiments of this invention relating to a method of catalyst manufacture comprises commingling an alumina carrier material with a common solution of a precursor compound of a platinum group metal and a mercaptocarboxylic acid and effecting the deposition of said platinum group metal on the outer surface of said carrier material, said solution being first aged for a period of from about 5 to about 15 minutes at a temperature of from about 50° to about 100° C.

A still more specific embodiment of the present invention is in a method of catalyst manufacture which comprises commingling a gamma-alumina carrier material with a common solution of chloroplatinic acid and thiomalic acid and effecting the deposition of a platinum component on the outer surface of said carrier material, said solution being first aged for a period of from about 5 minutes to about 15 minutes at a temperature of from about 50° to about 100° C.

Other objects and embodiments of this invention will become apparent in the following more detailed specification.

In accordance with the method of this invention, a refractory inorganic oxide support or carrier material is initially commingled with a common solution of a precursor compound of a catalytically active metallic component and a sulfur-containing carboxylic acid. The refractory inorganic oxides may be naturally occurring materials, for example clays and silicates such as fuller's earth, Attapulgus clay, feldspar, halloysite, montmorillonite, kaolin and diatomaceous earth, frequently referred to as siliceous earth, diatomaceous silicate, kieselguhr and the like, and the naturally occurring materials may or may not be activated prior to use by one or more treatments including drying, calcining, steaming and/or acid treatment. Synthetically prepared refractory inorganic oxides like alumina, silica, zirconia, boria, thoria, magnesia, titania, chromia, etc., or composites thereof, particularly alumina in combination with one or more refractory inorganic oxides, for example, alumina-silica, alumina-zirconia, alumina-chromia and the like are especially suitable. In some cases, the refractory inorganic oxide support or carrier material may also exhibit a catalytic effect alone or in combination with other components of the catalytic composite. Alumina is a preferred refractory inorganic oxide, and the alumina may be any of the various hydrous aluminum oxides or alumina gels including alpha-alumina monohydrate (boehmite), alpha-alumina trihydrate (gibbsite), beta-alumina trihydrate (bayerite), and the like. Activated aluminas, such as have been thermally treated to eliminate substantially all of the water and/or hydroxyl groups commonly associated therewith, are particularly useful. Preferably, the alumina is an activated alumina with a surface area of from about 100 to about 500 square meters per gram, especially gamma-alumina and eta-alumina resulting from a thermal treatment of boehmite alumina and bayerite alumina respectively, generally at a temperature of from about 400° to about 850° C. The alumina may be employed in any suitable shape or form including spheres, pills, extrudates, granules, cakes, briquettes, rings, etc., and particularly low density spheres such as are continuously manufactured by the oil drop method described in U.S. Pat. No. 2,620,314.

The catalytically active metallic component of the catalyst manufactured in accordance with the method of this invention may be any one of several catalytically active metals or metal oxides known to the art. Said catalytically active metals typically comprise a metal of Groups IVA, IB, VIB, VIIB, and VIII of the Periodic Table. The catalytically active metallic components herein contemplated thus include copper, silver, gold, molybdenum, chromium, tungsten, manganese, technetium, rhenium, germanium, tin, lead, iron, nickel, cobalt, platinum, palladium, rhodium, ruthenium, osmium, iridium, etc., alone or in combination, and in the oxidized or reduced state. The catalytically active metallic component preferably comprises a metal of Group VIII, and more preferably a metal of the platinum group of Group VIII. Precursor compounds suitable for use in an impregnating solution are generally those compounds subject to thermal decomposition. Suitable precursor compounds of Group VIII metals for use herein, that is precursor compounds of iron, nickel, cobalt, platinum, palladium, ruthenium, rhodium, osmium, and iridium, include nickel nitrate, nickel sulfate, nickel chloride, nickel acetate, nickel formate, cobaltous nitrate, cobaltous sulfate, ferric chloride, ferric nitrate, ferric sulfate, chloroplatinic acid, platinum tetrachloride, ammonium chloroplatinate, dinitrodiaminoplatinum, palladium chloride, chloropalladic acid, rhodium trichloride, ruthenium tetrachloride, osmium trichloride, iridium trichloride, and the like.

In any case, pursuant to the present invention, the selected precursor compound is prepared in a common solution with a sulfur-containing organic acid which may be a thio acid or a mercaptocarboxylic acid. Suitable sulfur-containing organic acids thus include carbothiolic acids, carbothionic acids and carbodithiolic acids as well as mercaptocarboxylic acids, for example methanethiolic acid, ethanethiolic acid, propanethiolic acid, methanethionic acid, ethanethionic acid, propanethionic acid, ethanedithiolic acid, propanedithiolic acid, and the like. The sulfur-containing organic acid is preferably a mercaptocarboxylic acid, for example, mercaptoacetic acid (thioglycolic acid), 3-mercaptopropionic acid, 2-mercaptosuccinic acid (thiomalic acid), carboxymethylmercaptosuccinic acid and the like. For optimum results, the sulfur-containing organic acid should be dissolved in the impregnating solution in at least an equimolar amount with the precursor compound of the catalytic component, although a larger molar excess up to about 10:1 or more may be employed.

In accordance with the method of this invention, the aforesaid common impregnating solution is aged prior to use in the impregnation of the carrier material. The common solution is suitably aged over a period of from about 5 minutes at a relatively high temperature to about 24 hours at a relatively low temperature, said temperature in any case being in the range of from about 25° to about 100° C. While the solution may be aged for periods in excess of 24 hours, no particular advantage results therefrom. In a preferred embodiment of this invention, the solution is aged for a period of from about 5 to about 15 minutes at a temperature of from about 50° to about 100° C. As will appear with reference to the examples appended hereto, the described aging treatment results in an unexpected and appreciable increase in catalyst activity, particularly with respect to the conversion of hydrocarbons and carbon monoxide.

The carrier material, preferably gamma-alumina or eta-alumina, is commingled with the described common solution and impregnated therewith utilizing techniques known to the art. Thus, the carrier material is suspended, soaked, dipped one or more times, or otherwise immersed in the solution. Preferably, a given volume of a particulate carrier material is immersed in a substantially equal volume of impregnating solution, and the carrier material maintained in contact with the solution for a brief period at ambient temperature. The solution is thereafter evaporated to dryness in contact with the carrier material leaving the catalytic component, or a precursor thereof, deposited on the surface of said carrier material. For example, a volume of ⅛ inch alumina spheres is immersed in a substantially equal volume of a common aqueous solution of chloroplatinic acid and thiomalic acid in a steam-jacketed rotary dryer and tumbled therein for a brief period at room temperature. Steam is thereafter applied to the dryer jacket to expedite evaporation of the solution and recovery of substantially dry impregnated particles. The resulting composite is subsequently heat treated, generally at a temperature of from about 315° to about 925° C. for a period of from about one-half to about 2 hours or more in an oxidizing atmosphere, and preferably further heat treated in a reducing atmosphere such as hydrogen at said conditions of time and temperature. Sulfidation, by treating the catalyst composite in contact with hydrogen sulfide at ambient temperature, has in some cases been shown to be of advantage.

The following examples are presented in illustration of the method of this invention and are not intended as an undue limitation on the generally broad scope of the invention as set out in the appended claims.

EXAMPLE I

In this example, representing a prior art method of preparation, about 200 cubic centimeters of ⅛ inch gamma-alumina spheres were immersed in 600 milliliters of a freshly prepared impregnating solution contained in a steam-jacketed rotary dryer. The impregnating solution contained a sufficient quantity of chloroplatinic acid to provide 0.32 Troy ounces of platinum per cubic foot of finished catalyst, and further contained thiomalic acid in a 3:1 mole ratio with the chloroplatinic acid. The spheres were tumbled in the solution for a brief period at ambient temperature after which steam was applied to the dryer jacket and the solution evaporated to dryness in contact with the tumbling spheres. The impregnated spheres were substantially calcined in air for 1 hour at 520° C. and therafter reduced in hydrogen for 1 hour at 565° C. The catalyst of this example is hereinafter referred to as Catalyst A.

EXAMPLE II

The catalyst of this example, hereinafter referred to as Catalyst B, was prepared substantially as described in the previous example except that the chloroplatinic acid-thiomalic acid solution was aged for 20 hours at room temperature before the addition of the alumina spheres thereto.

EXAMPLE III

The catalyst of this example was prepared substantially as described in the previous examples except that the chloroplatinic acid-thiomalic acid solution was aged for 10 minutes at 90° C. before the addition of the alumina spheres thereto. The catalyst of this example is hereinafter referred to as Catalyst C.

The catalysts thus prepared were evaluated with respect to the conversion of compound monoxide and hydrocarbons contained in a gaseous mixture of the following composition:

| Component | Mole % |
|---|---|
| CO | 1.0 |
| $C_3H_6$(Propylene) | 0.025 |

-continued

| Component | Mole % |
|---|---|
| O$_2$ | 2.5 |
| H$_2$O | 10.0 |
| N$_2$ | 86.475 |

In each case, 20 cubic centimeters of catalyst was disposed as a fixed bed in a reactor or converter having an external heating means. The catalyst temperature was first brought to 1100° F. inlet temperature under a blanket of nitrogen after which the described gaseous mixture was charged to the reactor at a total flow rate of 5,000 cubic centimeters per minute, and passed over the catalyst at a gaseous hourly space velocity for about 15,000. The gaseous mixture was processed over the catalyst for 30 minutes after which heating was discontinued and a temperature-conversion curve was recorded as the catalyst cooled. The relative activity of the catalyst is reported below in Table I, the activity being reported as the conversions achieved at 1,000° F. and at 550° F.

TABLE I

| Catalyst | HC Conversion, % | | CO Conversion, % | |
|---|---|---|---|---|
| | at 550° F. | at 1000° F. | at 550° F | at 1000° F. |
| A | 25.8 | 68.1 | 86.6 | 99.6 |
| B | 32.6 | 71.2 | 87.8 | 99.5 |
| C | 35.7 | 73.5 | 91.4 | 99.5 |

I claim as my invention:

1. In the method of catalyst manufacture wherein a refractory inorganic oxide carrier is commingled with a common solution of a compound of a metal selected from Groups IVA, IB, VIB, VIIB and VIII of the Periodic Table and a sulfur-containing carboxylic acid selected from the group consisting of carbothiolic, carbothionic, carbodithiolic and mercapto-carboxylic acids, to deposit said metal compound on the outer surface of said carrier, the improvement, which comprises aging said common solution, prior to its commingling with said carrier, for a period of from about 5 minutes to about 24 hours at a temperature of from about 25° to about 100° C., the aging time decreasing with increasing temperature.

2. The method of claim 1 further characterized in that said solution is aged for a period of from about 5 to 15 minutes at a temperature of from about 50° to about 100° C.

3. The method of claim 1 further characterized in that said acid is a mercaptocarboxylic acid.

4. The method of claim 1 further characterized in that said acid is thiomalic acid.

5. The method of claim 1 further characterized in that said acid is thioglycolic acid.

6. The method of claim 1 further characterized in that said acid is mercaptopropionic acid.

7. The method of claim 1 further characterized in that said acid is carboxymethylmercaptosuccinic acid.

8. The method of claim 1 further characterized in that said carrier is alumina.

9. The method of claim 1 further characterized in that said carrier is gamma-alumina.

10. The method of claim 1 further characterized in that said carrier is eta-alumina.

11. The method of claim 1 further characterized in that said metal compound is a compound of a metal of Group VIII.

12. The method of claim 1 further characterized in that said metal compound is a platinum group metal compound.

13. The method of claim 1 further characterized in that said metal compound is chloroplatinic acid.

* * * * *